United States Patent [19]

Voigt

[11] Patent Number: 5,519,259
[45] Date of Patent: May 21, 1996

[54] DEVICE FOR CONTROLLING THE SPEED OF A MOTOR VEHICLE

[75] Inventor: Achim Voigt, Eschborn, Germany

[73] Assignee: VDO Adolf Schindling AG, Frankfurt, Germany

[21] Appl. No.: 314,067

[22] Filed: Sep. 28, 1994

[30] Foreign Application Priority Data

Nov. 2, 1993 [DE] Germany .......................... 43 37 338.0

[51] Int. Cl.⁶ .............................. B60K 31/00; B60Q 1/54
[52] U.S. Cl. ........................ 307/10.1; 123/361; 180/179; 290/40 A; 340/425.5; 361/239
[58] Field of Search ..................................... 307/9.1, 10.1, 307/120; 123/361; 180/170, 178, 179; 340/425.5, 439; 361/236, 239; 290/40 R, 40 A

[56] References Cited

U.S. PATENT DOCUMENTS

| | | | |
|---|---|---|---|
| 4,865,151 | 9/1989 | Kobayashi et al. | 123/361 |
| 5,086,740 | 2/1992 | Wiggins et al. | 123/361 |
| 5,125,471 | 6/1992 | Iwaoka et al. | 180/179 |
| 5,197,563 | 3/1993 | Sakonju et al. | 180/179 |
| 5,293,855 | 3/1994 | Nakamura | 123/361 |

*Primary Examiner*—William M. Shoop, Jr.
*Assistant Examiner*—Richard T. Elms
*Attorney, Agent, or Firm*—Martin A. Farber

[57] ABSTRACT

In a device for controlling the speed of a motor vehicle in which a power-setting member for the internal combustion engine of the vehicle can be displaced via a switchable coupling by an electric motor, the electric motor receives the voltage necessary for the displacement of the power-setting member for the speed to be maintained from a control device, and the coupling is adapted to be switched by means of an electromagnet for separating the motor from the power-setting member when the device for controlling the speed is not in action. A first controllable switch is connected between one pole of the source of operating voltage and the electromagnet and a second controllable switch is connected between the other pole of the source of operating voltage and the electromagnet. The switches are adapted to be switched into conductive state by means of an operating element. A junction point between the electromagnet and the second controllable switch is connected via an optical indicating device to the one pole of the source of operating voltage.

6 Claims, 1 Drawing Sheet

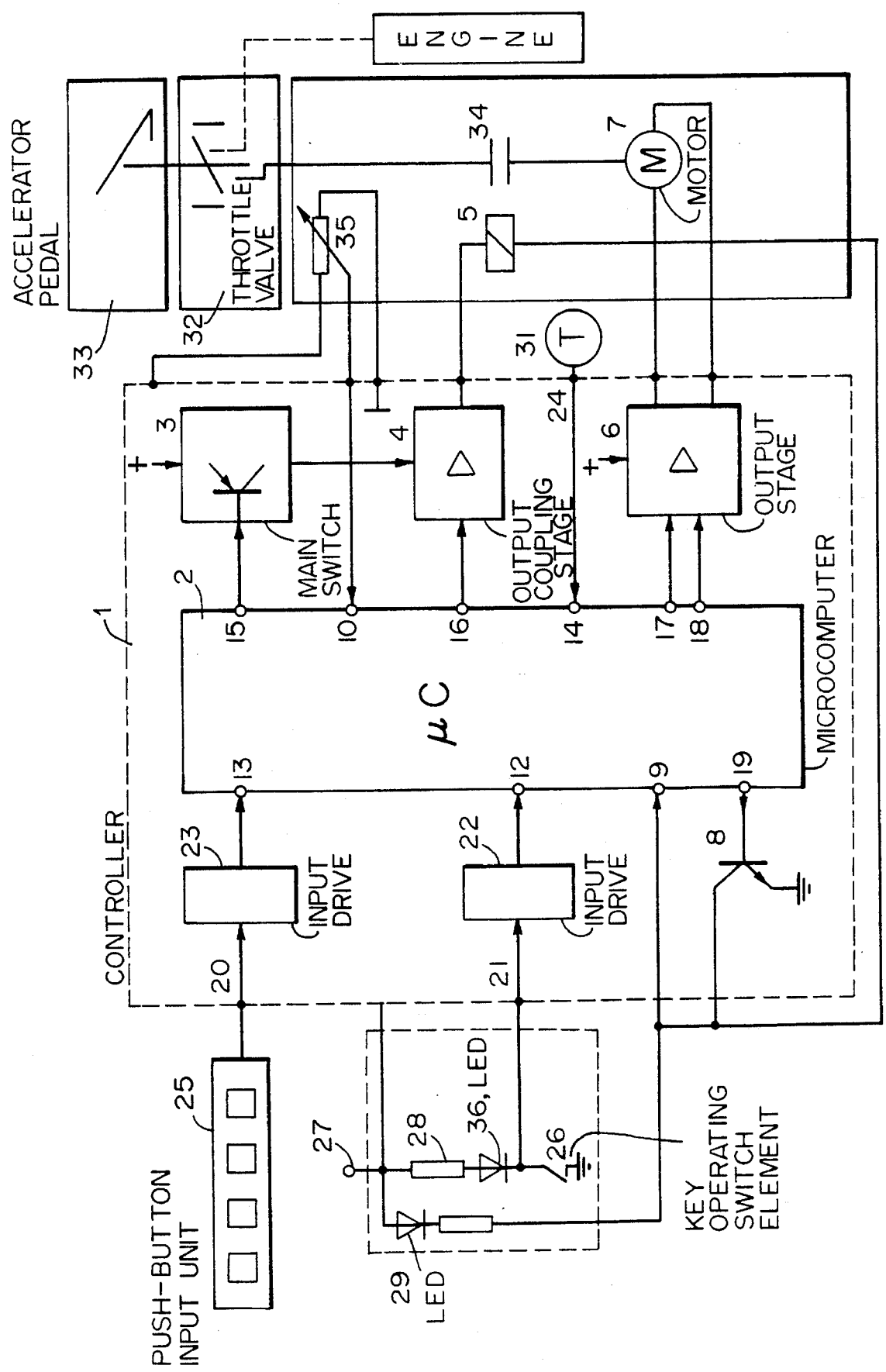

5,519,259

DEVICE FOR CONTROLLING THE SPEED OF A MOTOR VEHICLE

FIELD AND BACKGROUND OF THE INVENTION

The present invention relates to a device for controlling the speed of a motor vehicle in which a power setting member for the internal combustion engine of the vehicle can be adjusted by an electric motor via a switchable coupling. The electric motor receives the voltage necessary for displacing the power-setting member for the speed which is to be maintained from a control device, and the coupling is adapted to be switched by means of an electromagnet in such a manner that the motor is separated from the power-setting member when the device for controlling the speed is not active.

In devices for controlling speed—in the following also referred to as speed control systems—it is important, in addition to obtaining reliable manner of operation as such, that the driver be informed that the speed control system was in action, i.e. that when the speed control system is in action, he should not be driving with the belief that the speed control system is not active.

SUMMARY OF THE INVENTION

It is an object of the present invention therefore to provide measures in a speed control system which compel the driver, before traveling with speed control, to actuate an operating member which is present in addition to the customary operating buttons and to recognize from an indicating device that the speed control is in action. In this connection, the indicating device should, in particular, operate reliably by itself, i.e. indicate the existence that speed control is in action without further testing or monitoring means if the system is actually in action.

According to the invention, a first controllable switch (3) is arranged between one pole (+) of the source of operating voltage and an electromagnet (5) and a second controllable switch (8) is arranged between the other pole (ground) of the source of operating voltage and the electromagnet (5). The switches are adapted to be switched into a conductive state by an operating element (26), and a junction point (9) between the electromagnet (5) and the second controllable switch (8) is connected via an optical indicating device (29) to the one pole (+) of the source of operating voltage.

By the use of the first switch, activation is possible only by operating the operating element, while the second switch permits activation, and therefore the flow of current through the electromagnet, only when the indicating device is also connected. That device is preferably formed of a light-emitting diode.

In a further development of the device of the invention, the control device (1) contains a microcomputer (2) to which a signal can be fed from the operating element (26), and that one of the outputs of the microcomputer (2) is connected to a control input of the first switch (3) while another output is connected to a control input of the second switch (8).

The junction point is preferably connected to an input (9) of the microcomputer (2).

In this way, monitoring of the indicating device for a short circuit or break in the line is possible. In this connection, individual conditions of error can be recognized particularly clearly if the input (9) of the microcomputer (2) is an input for analog signals.

A further development of the invention provides that an output stage (4) which can be controlled by the microcomputer (2) is arranged between the first switch (3) and the electromagnet (5). In this way, disconnection by means of the first switch is possible independently of the function of the output stage, so that the first switch, is operated together with the operating element in the manner of a main switch which permits disconnection even if an output stage is defective.

In another development of the invention, a circuit with a find light (36) can be activated together with the control device (1). In this way, the driver's attention is directed to the operating element only when the control device is in operation—and the actuating of the operating element is therefore meaningful.

The invention permits numerous embodiments.

BRIEF DESCRIPTION OF THE DRAWINGS

With the above and other objects and advantages in view, the present invention will become more clearly understood in connection with the detailed description of a preferred embodiment in which the sole FIGURE is a schematic circuit of the invention.

DETAILED DESCRIPTION OF THE PREFERRED EMBODIMENT

In the device according to the invention which is shown in the drawing, the essential parts of the control device 1 are a microcomputer 2, a first switch 3—hereinafter referred to as the main switch—an output stage 4 for driving an electromagnet 5, an output stage 6 for driving an electric motor 7, and a transistor 8 which serves as second switch. The microcomputer 2 has inputs 9, 10 for analog signals, which are conducted in known manner over a multiplexer and an analog-digital converter (not shown). Furthermore, the microcomputer 2 has inputs 12, 13 and 14 for digital signals as well as outputs 15, 16, 17, 18, 19. The inputs 12, 13 serve for the feeding of binary signals at inputs 20, 21 of the control device and via input drive circuits 22, 23. Binary signals are sent out over the outputs 15, 16, 19 in order to control the main switch 3, the coupling output stage 4, and the transistor 8. Pulse-width-modulated signals are available at the outputs 17 and 18 for the controlling of the output stage 6.

In order to control the speed of the motor vehicle, a speed-proportional signal is given off by a speed transmitter 31 and fed via an input 24 of the control device 1 to an input 14 of the microcomputer 2. By comparison with a stored desired value any change which may be necessary in the position of a throttle valve 32 is calculated in the microcomputer 2. This valve can in itself be operated by an accelerator pedal 33, but it can be opened further, than determined by the accelerator pedal 33, by the motor 7 via a coupling 34. A potentiometer 35 reports the position of the throttle valve to the control device. Displacement of the throttle valve 32 by motor is, however, only possible when the coupling 34 is closed by a flow of current through the electromagnet 5.

Known speed control systems are operated by an input unit 25 with push buttons for disconnecting the control, for the setting, i.e. the storing of the speed traveled at the time as desired value, and for the resumption of the control of a previously set speed. For the setting, two keys, each having a double function can be provided, a longer depressing of one of the keys effecting an acceleration or deceleration of the vehicle. The output signals of the input unit 25 pass to the input 13 of the microcomputer 2 via an input 20 of the control unit 1 and via the input drive circuit 23.

In the device of the invention, there is provided, in addition to the known input unit 25, a key operated switching element designated herein as a key 26 which is connected between ground potential and the input 21 of the control device 1 to the input circuit 22. At the input circuit 22, the input 21 is connected with positive voltage via a resistor, as a result of which the voltage on the input 21 is dependent on the position of the key 26. A corresponding signal is fed to the input 12 of the microcomputer 2.

By actuation of the key 26, the main switch 3 is brought into conductive state. Furthermore, the transistor 8 becomes conductive via the output 19 of the microcomputer 2. In this way, the speed control system is prepared for activation somewhat in advance by the input unit 25. Actuation by mistake of one of the keys of the input unit 25 which has taken place earlier does not lead to the controlling of the throttle valve by the speed control system since the coupling 34 has been open until that time. Acceleration of the vehicle by mistake is thus avoided.

After the turning on of the main switch 3, and thus also of the transistor 8, a light emitting diode 29 arranged in the vicinity of the key 26 receives voltage so that, by the lighting up of the light-emitting diode 29, the attention of the driver is directed to the fact that the speed control system is operative. By the detection of the voltage at the input 9 of the microcomputer, errors can be noted, for instance a break in the line or a short circuit in the region of the light-emitting diode 29. Such an error message can be processed further in suitable manner and used, for instance, for an irreversible disconnecting or for a storing of the error.

If, however, despite the fact that the speed control system is active, no indication is given by the light-emitting diode 29 because the transistor 8 is defective or a suitable control voltage is not present at the output 19, the throttle valve 32 can also not be opened since, in this case, the electromagnet 5 does not receive current and the coupling 34 is thus opened. This error can also be recognized via the evaluation of the voltage at the input 9. Further measures such as, for instance, an irreversible disconnect or an error storage can be introduced also in this case.

An operating voltage which can be disconnected by the ignition switch of the vehicle can be fed via a connection 27 to the control device 1 and the light-emitting diode 29. A further light-emitting diode 36, which lights up when the control device 1 receives operating voltage, is furthermore connected via a resistor 28 to the connection 27. This further light-emitting diode 36 has the function of a find light for the key 26 which calls the attention of the driver to the key 26 only when the control device 1 is in operation—actuation of the key 26 is therefore meaningful.

I claim:

1. A control device for controlling the speed of a motor vehicle, the vehicle having an internal combustion engine, a power setting member for the internal combustion engine, an electric motor, an electromagnet, and a switchable coupling for connecting the motor to the setting member for adjusting the setting member;

wherein the electric motor receives a voltage necessary for displacing the setting member for a speed which is to be maintained by the control device;

the coupling is switchable by means of the electromagnet to disconnect the motor from the setting member when the control device is inactive;

the control device is operative with a source of operating voltage having a first pole and a second pole, and comprises a first controllable switch connected between the first pole of said source of operating voltage and said electromagnet;

an operating element, an optical indicating device, and a second controllable switch connected between the second pole of said source of operating voltage and said electromagnet; and wherein said switches are switched into conductive state by said operating element, and a circuit point between said electromagnet and said second controllable switch is connected via said optical indicating device to the first pole of said source of operating voltage.

2. A control device according to claim 1, further comprising a microcomputer to which a signal is feedable from said operating element; and wherein said microcomputer has a first output connected to a control input of said first switch and a second output connected to a control input of said second switch.

3. A control device according to claim 2, wherein said microcomputer has an input connected to said circuit point.

4. A control device according to claim 3, wherein the input of said microcomputer is an input for analog signals.

5. A control device according to claim 2, further comprising an output stage which is controllable by said microcomputer, and is connected between said first switch and said electromagnet.

6. A control device according to claim 1, further comprising a find light connected to said operating element in order to be energized together with the control device.

* * * * *